United States Patent

[11] 3,545,476

[72] Inventors Theodore J. Dykzeul
Rolling Hills;
Richard W. McKinney, Lakewood,
California
[21] Appl. No. 803,283
[22] Filed Feb. 28, 1969
Division of Ser. No. 616,841, Feb. 17, 1967,
now Patent No. 3,467,119, dated Sept. 16,
1969. Divided and this application Feb. 28,
1969, Ser. No. 803,283
[45] Patented Dec. 8, 1970
[73] Assignee Robertshaw Controls Company
Richmond, Virginia
a corporation of Delaware

[54] THERMOSTATIC CONTROL DEVICE
4 Claims, 9 Drawing Figs.
[52] U.S. Cl. .................................................. 137/315,
137/454.2, 137/505.41

[51] Int. Cl. ..................................................... F16k 27/00
[50] Field of Search ........................................... 137/505.41,
505.38, 505.39, 315, 454.2

[56] References Cited
UNITED STATES PATENTS
| | | | |
|---|---|---|---|
| 1,231,293 | 6/1917 | Peters............................ | 137/505.41 |
| 3,343,557 | 9/1967 | Dunn............................. | 137/505.41X |
| 3,439,699 | 4/1969 | Caparone...................... | 137/315 |

Primary Examiner—Harold W. Weakley
Attorneys—Auzville Jackson, Jr., Robert L. Marben and Anthony A. O'Brien ABSTRACT: A control device having a pressure regulator for regulating the pressure of a fluid flow wherein the regulator structure is embodied in a housing for unitary assembly in the control device casing; the housing includes a valve slot for a frustoconical regulating valve member integrally formed on the regulating diaphragm.

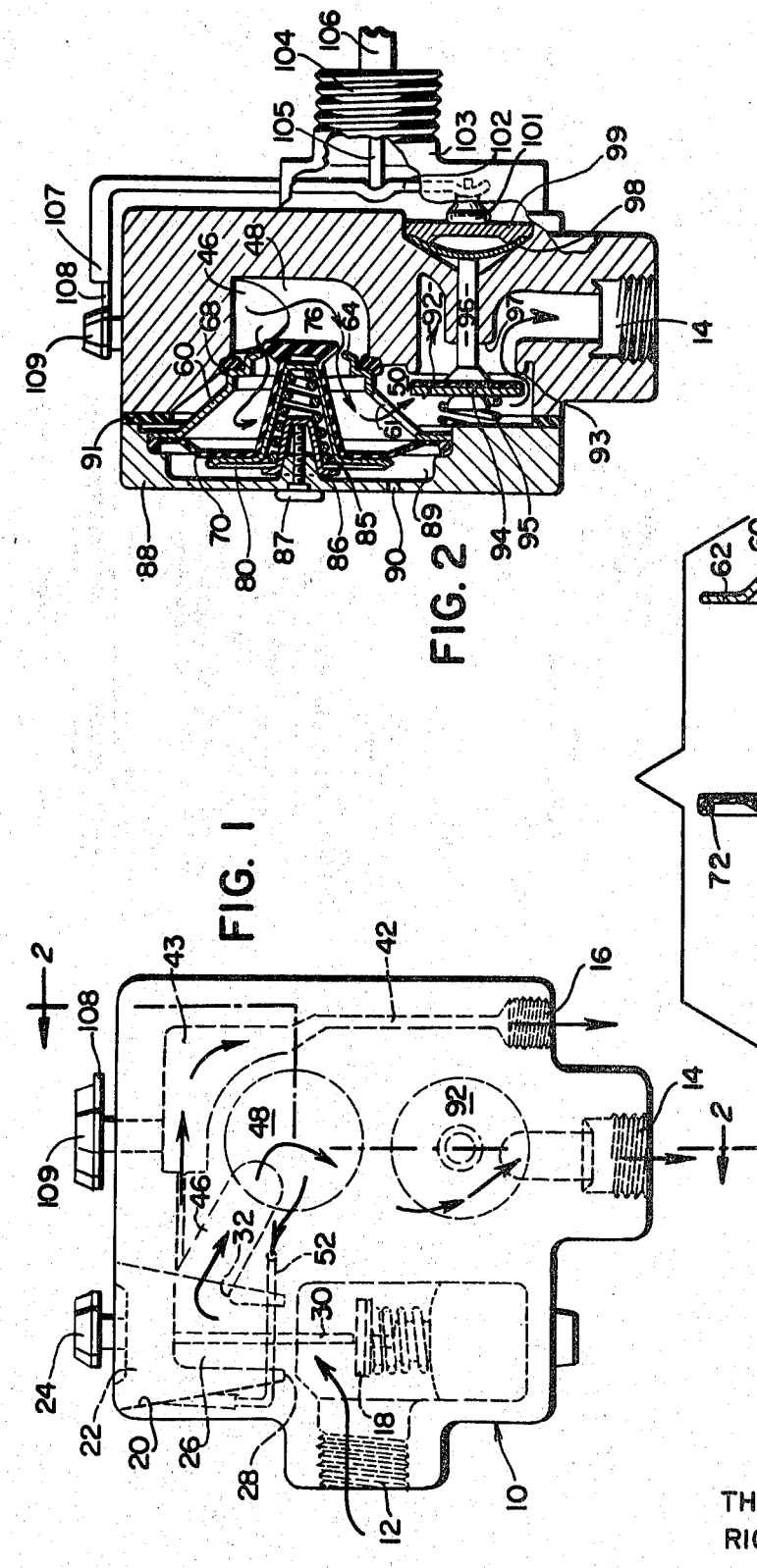

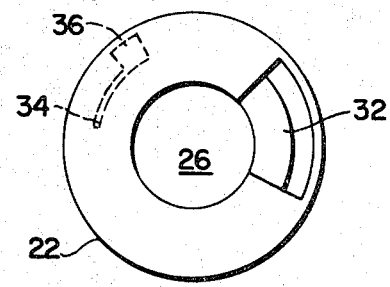
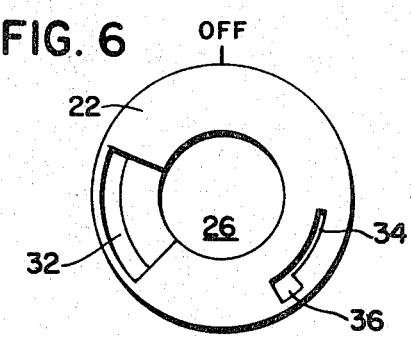
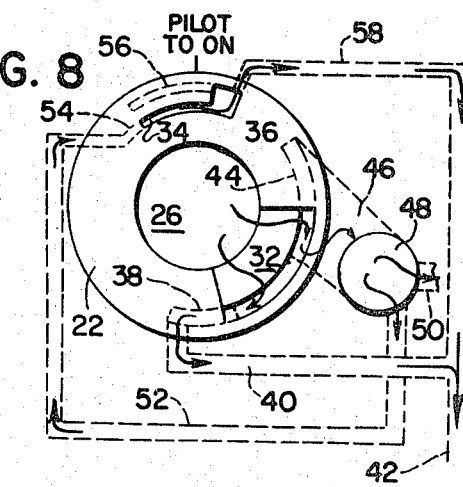
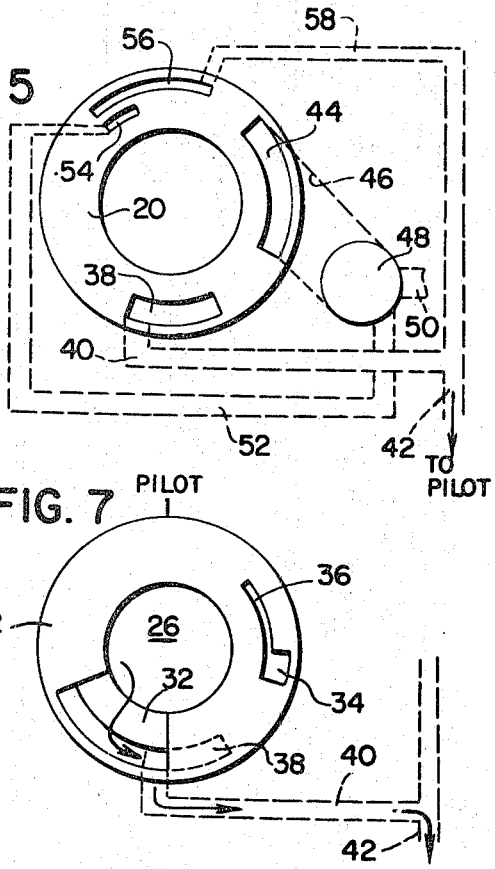
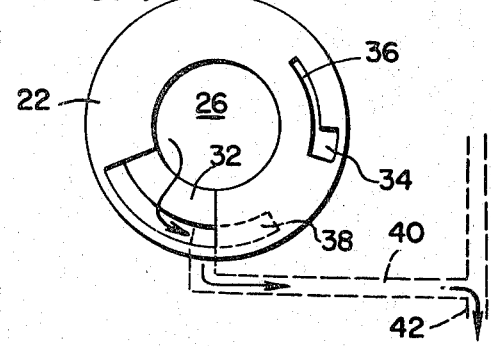
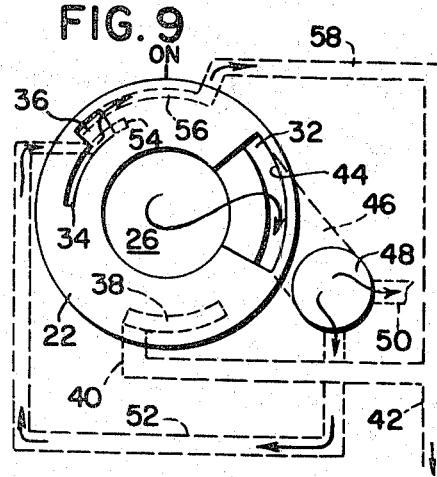

3,545,476

1

THERMOSTATIC CONTROL DEVICE

This is a divisional application of U.S. Pat. application Ser. No. 616,841 filed Feb. 17, 1967 now U. S. Pat. No. 3,467,119.

This invention relates to fluid flow control devices and more particularly to such a device for controlling, and regulating the pressure of a fluid flow to main and pilot burner apparatus.

It has become conventional practice to provide a thermostatic control device with an integrated pressure-regulating means as exemplified in U. S. Pat. No. 3,133,556 . However, in such a control device, only the main flow of fuel is pressure-regulated while the pilot flow of fuel is not pressure-regulated. While it is desirable the that the pilot flow of fuel be subject to pressure regulation during normal operation, the use of non-regulated pilot flow is also desired during lighting of the pilot burner.

It is, therefore, an object of the present invention to provide a fluid flow control device with an economical, simply constructed pressure regulator that is easily assembled in the control device casing.

Another object of this invention is to construct a pressure regulator with its own valve member and valve seat for unitary assembly in control device casing.

A further object of this invention is to provide the flexible diaphragm of pressure regulator with an integrally formed valve member.

In practicing the present invention, a fluid control device is provided with a casing having inlet and outlet means, and a pressure-regulating assembly in the casing to regulate the pressure of a fluid flow therethrough; such assembly includes a housing having a valve slot, a diaphragm peripherally sealed in the casing and defining a flexible wall of the housing opposite the valve slot, a backup plate and adjustable spring means biasing the diaphragm, a valve member integrally formed on the end of a frustoconical portion of the diaphragm and extending through the housing to cooperate with the upstream side of the valve seat.

Other objects and advantages of the present invention will become apparent from the following description of the preferred embodiment, taken in connection with the accompanying drawings wherein:

FIG. 1 is a front elevation, with parts in dashed lines to show flow passages, of a thermostatic control device embodying the present invention;

FIG. 2 is a partial section view taken substantially along the staggered line 2–2 of FIG. 1;

FIG. 3 is an exploded cross-sectional view of details of FIG. 2;

FIG. 4 is a schematic view of a manually rotatable plug valve utilized in FIG. 1;

FIG. 5 is a schematic top view of the cavity in FIG. 1, which receives the plug valve of FIG. 4 with dashed lines to indicate the flow passages;

FIG. 6 is a schematic top view of the plug valve of FIG. 1 shown in its "off" position;

FIG. 7 is a schematic top view showing the plug valve of FIG. 4 rotated in the cavity of FIG. 5 to a "pilot" position where there is flow only to the pilot outlet;

FIG. 8 is a schematic top view showing the plug valve of FIG. 4 in an intermediate position in the cavity of FIG. 5 while being rotated from "pilot" to "on" positions wherein there is a dual flow to the pilot outlet and a partial flow to the main outlet; and FIG. 9 is a schematic top view showing the plug valve of FIG. 4 rotated in the cavity of FIG. 5 to an "on" position where there is a single flow to the pilot outlet and a fuel flow to the main outlet.

As is illustrated in FIG. 1, the present invention is embodied in a thermostatic control device including a casing, indicated at 10, having an inlet 12, a main outlet 14 for supplying fuel to a main burner (not shown) and a pilot outlet port 16 for supplying fuel to a pilot burner (not shown). A thermoelectric safety valve 18 is positioned to control the inlet 12; such safety devices are well known in the art and a detailed description is

2 being omitted for the sake of brevity except to note that the electromagnet thereof is a holding magnet which is energized by means of a thermocouple disposed in the flame of the pilot burner. Downstream of the safety valve 18, the casing 10 has a frustoconical cavity or bore 20 which is opened at its bottom to communicate with the inlet 12.

A manually operated, tapered plug valve 22 is rotatably seated in the bore 20 and is biased therein by a coil spring (not shown) mounted in compression between the large end of plug valve 22 and a top wall or cover on casing 10. A plug valve stem centrally extends from the large end of plug valve 22 through a suitable bore in such top wall and a manually operable knob 24 is keyed to the exterior end of plug valve stem for rotating the plug valve 22. The bottom wall of plug valve 22 is hollowed out to define a chamber 26 and the truncated end defines an annular valve seat 28 which cooperates with the safety valve 18 to control fluid flow from the inlet 12 to the plug valve chamber 26. A reset stem 30 carried by the plug valve stem and being depressable with the knob 24, centrally extends through the bore 26 to engage the safety valve 18 during a resetting operation. The combined plug valve and safety valve construction has not been described in detail because such construction may take any suitable form well known in the art; e.g. see U.S. Pat. No. 3,002,519.

Intermediate its ends, the plug valve 22 (see FIG. 4) has a lateral port 32 permitting flow from the plug valve chamber 26. circumferentially and axially spaced from lateral port 32, the plug valve 22 has a peripheral opening of generally L-shaped configuration defined by an arcuate groove 34 which terminates in a radially enlarged groove 36.

The plug valve 22 is manually rotated between a plurality of controlling positions to provide selective registry with its passages and a plurality of flow passages which open into the bore 20. These flow passages in the casing casing 10, are schematically illustrated in FIG. 5 to show their proper relationship to the outlets 14 and 16. An arcuately shaped pilot port 38 opens into the bore 20 and has one end portion communicating with a bypass pilot flow passage 40 that joins a pilot flow outlet conduit 42 having a filter 43 therein and leading to the pilot outlet 16. Circumferentially spaced from pilot port 28, a larger arcuately shaped main port 44 opens into the bore 20 and oppositely communicates with a main flow passage 46 that leads to a pressure regulating chamber 48. Downstream of the chamber 48, a first flow passage 50 leads to a thermostatic valve chamber which communicates with the main outlet 14 and a second flow passage 52 defining a loop conduit which communicates with an arcuate port 54 opening into the bore 20. The port 54 is axially and circumferentially spaced from the ports 38 and 44 and as viewed in FIG. 5 is radially spaced from an adjacent arcuate port 56 which has a greater arcuate length than port 54 so that its extension communicates with a second pilot flow passage 58 that joins the pilot flow outlet conduit 42. The plug valve 22 of FIG. 4 is rotatably disposed in the bore 20 of FIG. 5 as will be described more fully hereinafter.

As is illustrated in FIG. 2 and FIG. 3 the pressure regulating chamber 48 includes a generally frustoconical housing 60, stamped from suitable sheet material, such as aluminum, having annular mounting flange 62 on its large end. The truncated end of housing 60 defines an annular valve seat 64 and spaced slightly from such seat 64, the conical wall of housing 60 is deformed to provide an annular L-shaped shoulder 66 that is forced into sealing engagement with an O-ring gasket 68, made of any suitable resilient material, such as rubber, and held against the annular wall which is part of the casing chamber 48. The lower part of conical housing 60 (as viewed in FIGS. 2 and 3) which 3) is cut out to define an outlet 61 from the housing 60.

A flexible diaphragm 70, made of rubber or the like has a beaded annular flange 72 on its outer periphery for mounting and sealing purposes. The central portion of diaphragm 70 has a hollow frustoconical shape 74, the truncated end of which is flared to define a valve member 76; as shown in FIG. 2, the valve member 76 is disposed on the upstream side of the valve seat while the diaphragm 70 is disposed on the downstream side thereof. A backup plate or pan 80 has a generally cup-shaped configuration with an annular lip 82 engaging a portion of the diaphragm 70 and with a frustoconical wall 84 disposed in the similarly shaped diaphragm conical portion 74.

A helically coiled spring 85 is disposed in the conical cup 84 and is mounted in compression between the bottom wall thereof and the peripheral flange of a similarly shaped spring retainer 86. An adjustment screw 87 extends through a threaded boss on the front cover 88 of the casing 10 for selectively varying the bias that the spring 85 exerts on the diaphragm 70. The left side of the diaphragm 70 (as viewed in FIG. 2) defines an atmospheric chamber 89 which communicates with the atmosphere through a vent aperture 90 in the cover 88. The entire diaphragm assembly is assembled as a unit with the housing flange 62 being fixed to the cover 88 as by being staked or press-fitted into a recess in the cover 88 which is then sealed against the front wall of casing 10 by means of a gasket 91 and secured thereto as by threaded cap screws (not shown).

The regulator housing outlet 61 communicates with the flow passage 50 that is separated from the thermostatic valve chamber 92 by means of an annular valve seat 93 to control the main flow to main outlet 14. A main disk 94 is biased toward the valve seat 93 by a coil spring 95 which is mounted in compression between the valve disk 94 and the adjacent surface of the casing cover 88. A valve stem 96 protrudes centrally through the valve seat 93 and slidably extends through a bored boss 97 on the rear wall of casing 10. The end of valve stem 96 protrudes into a counterbore on the rear wall of casing 10, which houses a snap-acting mechanism comprising a bowed snap disk 98 mounted on the annular knife edged fulcrum of a relatively thick disk 99 which is movable in such counterbore. Such snap acting mechanisms are well known in the art and may have any suitable construction.

The snap-acting mechanism is actuated by a thrust button 101 carried on the end of a lever 102 that is carried by a mounting shank 103. The shank 103 is secured to the rear wall of casing 10 as by threaded cap screws (not shown) and includes an externally threaded boss 104 for attaching the entire control device to a heating appliance, such as the tank of a hot water heater. A thermostatic unit of any suitable type, such as an inner rod 105 of Invar or the like and an outer concentric tube 106 of copper or the like is carried by the boss 104 so that the inner end of the rod rod 105 engages an intermediate portion of the lever 102; such a rod and tube thermostat is so well known that further description is unnecessary. The lever 102 protrudes out of a guide slot in the mounting shank 103 and has a perpendicularly bent end 107 which lies over the top of casing 10 (FIG. 2). The lever end 107 is engaged by a rotatable cam 108 secured to the stem of a temperature setting dial 109.

In the following description of the sequence of operation of the above control device, it will be assumed that the control is attached to a hot water heater and that the temperature setting dial 109 has been set at a desired water temperature, e.g. 140° F. FIG. 6 represents the "off"position of the plug valve 22 wherein none of the ports thereof are in registry with any of the openings in the bore 20; accordingly, the nonregistered flow passages 40, 46, 52 and 58 in casing 10 are not shown. To commence operation, the reset knob 24 is rotated from its "off"position to its "pilot"position whereby the plug valve 22 is rotated from the FIG. 6 position approximately 45° counterclockwise to the FIG. 7 position. Since only the bypass pilot flow 40 and the plug valve port 32 are in registry, the nonregistered flow passages 46, 52 and 58 in the casing 10 are not shown. Upon depression of the reset knob 24, the safety valve 18 is displaced from the plug valve seat 28 and a pilot flow of fuel may be traced from inlet 12 through valve seat 28, plug valve chamber 26, plug valve port 32, bore opening 38, bypass pilot flow passages 40, outlet pilot flow passage 42, and the pilot outlet 16 to the pilot burner which is then ignited as by a match. As soon as the pilot burner has heated the thermocouple and the coil of the electromagnet has been energized, the reset knob 24 released whereupon the safety valve 18 will be held in its open position. During this lighting operation, the plug valve 22 is not in position to permit a flow of fuel to the main bore opening 44 so there is no flow to the main outlet 14, even though the automatically operated valve 94 be in an open position, thus assuring a safe lighting condition. An additional safe lighting feature may be associated with the reset knob 24, i.e., a cooperating projection and cutout between the knob and the top of casing 10 to prevent reset depression of the knob 24 except when it is in its "pilot" position.

After release of the reset know 24, it is then rotated from its "pilot" position to its "on" position. During such rotation, the plug valve 22 does not shutoff the nonregulated flow to the bypass pilot conduit 40 until after the regulated flow to pilot conduit 58 has been established; thus, there is a period when regulated and nonregulated pilot flows are simultaneously established. Such an arrangement is shown in FIG. 8 wherein plug valve port 32 spans both the bypass pilot port 38 and the main port 44. The bypass pilot flow continues as described above above and the regulated pilot flow may now be traced from plug valve port 32 through the bore port 44, main flow passage 46, pressure regulating chamber 48, pilot flow passage 52, bore port 54, plug valve ports 34 and 36, bore port 56 and pilot flow passage 58 to the pilot outlet flow passage 42 where it is mixed with the nonregulated pilot flow from the bypass pilot conduit 40 for delivery to the pilot outlet 16 and the pilot burner. Such an arrangement assures a continuous flow of fuel to the pilot burner during rotation of the plug valve 22.

When the plug valve 22 is completely rotated to its "on" position, as illustrated in FIG. 9, the bypass pilot opening 38 is closed off so there is no bypass nonregulated flow to the bypass conduit 40. However, the main port 44 is in registry with the plug valve port 32 and the spaced pilot passageway openings 54 and 56 are in registry with the plug valve port 36 so there is a pressure-regulated main flow to the main passageway 50 and a pressure-regulated pilot flow to the pilot passageway 58.

The pressure-regulated main flow from the main passageway 50 is controlled by the automatically operated valve 94; e.g. with the temperature condition sensed by the thermostat thermostat 105—106 being lower than the desired temperature which has been preset by the dial 109 2), the rod 105 has caused movement of the lever button 101 so that the snap acting mechanism 98—99 has opened the main valve 94. Thus, in the FIG. 2 arrangement, there is a demand for the heat so there is a pressure regulated main flow through the main valve seat 93 and chamber 92 to the main outlet 14. When the temperature requirements in the medium being temperature controlled are satisfied, the valve 94 is closed. The valve 94 will thus cycle automatically in response to temperature variations sensed by the thermostat 105—106.

In the event that the pilot burner should become inoperative as evidenced by extinguishment of the flame thereat, the thermocouple will cool and the electromagnetic coil of the safety device 18 will be deenergized causing closure of the safety valve. Since the safety valve is is upstream of the plug valve 22, all fuel flows to the pilot burner and the main burner are cutoff. To reestablish the flame at the pilot burner, the igniting procedure outlined above must be repeated; i.e., the knob 24 must be rotated to its "pilot" position before it can be depressed to move the safety valve 18 to an open position.

Inasmuch as the present invention is subject to many modifications, variations and changes in detail, it is intended that all matter contained in the foregoing description of the preferred embodiment or shown on the accompanying drawing shall be interpreted as illustrative and not in a limiting sense.

We claim:

1. In a control device for regulating the pressure of a fluid flow, the combination including: a casing having inlet and outlet means and a passageway therebetween; a pressure regulator assembly in said casing regulating a fluid flow through said passageway comprising a regulator housing fixed in said casing and having a valve seat disposed in said passageway; a diaphragm having its periphery sealingly mounted in said casing and defining a flexible wall of said housing opposite to said valve seat; backup plate means on one side of said diaphragm conforming to the shape thereof for surface contact therebetween; adjustable spring means acting on said backup plate means to bias said diaphragm and said valve member to a valve open position; said diaphragm having a central portion with a frustroconical configuration extending from an opposite side thereof; a valve member integrally formed on the truncated end of the frustoconical center portion of said diaphragm, and said frustoconical center portion of said diaphragm being disposed in said housing and said valve member extending through said housing to cooperate with the upstream side of said housing.

2. The invention as recited in claim 1 wherein said housing comprises a stamped sheet material having a central conical portion, a mounting flange on one side of said conical portion, opening means on the other end of said conical portion defining said valve seat, and outlet port means cut out of said conical portion.

3. The invention as recited in claim 2 wherein said casing has a cover with an internal surface facing said passageway and wherein the mounting flange of said housing engages the periphery of said diaphragm and is secured to the internal surface of said cover whereby the entire pressure regulator assembly is assembled as a unit with said cover.

4. The invention as recited in claim 3 wherein said adjustable spring means comprises a spring retainer, a coil spring mounted in compression between the backup plate means and said retainer, and an adjusting screw extending through said cover into engagement with said retainer.